United States Patent
Edmark

(10) Patent No.: US 7,346,543 B1
(45) Date of Patent: Mar. 18, 2008

(54) VIRTUAL SHOWROOM METHOD

(76) Inventor: Tomima L. Edmark, P.O. Box 671269, Dallas, TX (US) 75367-1269

( * ) Notice: Subject to any disclaimer, the term of this patent is extended or adjusted under 35 U.S.C. 154(b) by 0 days.

(21) Appl. No.: 09/564,372

(22) Filed: May 2, 2000

Related U.S. Application Data

(60) Provisional application No. 60/184,789, filed on Feb. 24, 2000.

(51) Int. Cl.
G06Q 30/00 (2006.01)
G06F 17/30 (2006.01)

(52) U.S. Cl. .......................................... 705/26; 705/27
(58) Field of Classification Search ............ 705/26–27; 434/395, 396
See application file for complete search history.

(56) References Cited

U.S. PATENT DOCUMENTS

| | | | | |
|---|---|---|---|---|
| 5,465,291 A | * | 11/1995 | Barrus et al. ............... | 379/67.1 |
| 5,724,522 A | * | 3/1998 | Kagami et al. ............... | 705/26 |
| 5,754,850 A | * | 5/1998 | Janssen ....................... | 705/26 |
| 5,897,620 A | | 4/1999 | Walker et al. ................. | 705/5 |
| 5,930,769 A | * | 7/1999 | Rose ............................ | 705/26 |
| 5,956,525 A | * | 9/1999 | Minsky ......................... | 396/3 |
| 5,960,411 A | | 9/1999 | Hartman et al. .............. | 705/26 |
| 6,012,045 A | | 1/2000 | Barzilai et al. ............... | 705/26 |
| 6,144,388 A | * | 11/2000 | Bornstein ..................... | 345/629 |
| 6,219,085 B1 | * | 4/2001 | Hanna .......................... | 347/249 |
| 6,269,343 B1 | * | 7/2001 | Pallakoff ...................... | 705/26 |
| 6,307,568 B1 | * | 10/2001 | Rom ............................ | 345/629 |
| 6,310,627 B1 | * | 10/2001 | Sakaguchi .................... | 345/630 |
| 6,331,858 B2 | * | 12/2001 | Fisher .......................... | 345/582 |
| 6,570,608 B1 | * | 5/2003 | Tserng ......................... | 348/143 |
| 6,727,925 B1 | * | 4/2004 | Bourdelais ................... | 715/852 |
| 6,901,379 B1 | * | 5/2005 | Balter et al. .................. | 705/27 |
| 7,062,454 B1 | * | 6/2006 | Giannini et al. .............. | 705/27 |

OTHER PUBLICATIONS

Kawahara, Tatsuya; Tanaka, Katsuaki; Doshita, Shuji; "Virtual Fitting Room with Spoken Dialogue Interface;" Department of Information Science, Kyoto University (printed in IPSJ Journal vol. 39, No. 5, 1995-1999.*

White Pines Website, at web_archive_org/web/19981203103858/www_wpine_com/solutions dated Dec. 3, 1998.*

(Continued)

Primary Examiner—Matthew S. Gart
(74) Attorney, Agent, or Firm—Baker Botts L.L.P.

(57) ABSTRACT

The present invention provides a network server with enhanced graphics and improved methods for displaying articles offered for purchase, to allow a purchaser to fully evaluate the article while shopping "on-line." In a particular embodiment, a virtual showroom associated with the network server may be provided, for displaying first and second articles. A first electronic image representing the first article and a second electronic image representing the second article may also be provided. The second article may be complementary to the first article, such that the second article may be worn in conjunction with the first article. In another embodiment, a user may have the option to overlay the first electronic image with the second electronic image. In a particular embodiment, the second electronic image may include an at least partially translucent depiction of a substantial portion of the second article.

16 Claims, 13 Drawing Sheets

OTHER PUBLICATIONS

Business Wire, Takshele Corp. releases DpIV, a 4D Network Operating System, Nov. 1, 1996.*

"Major Publications Graduate School of Informatics, Kyoto University;" Department of Intelligence Science and Technology, Kyoto University; 1998.*

Fracassini, Camillo; "Quick 3D scan will offer fitting way to give you the ideal look;" SCOTSMAN, 03673290, p. 7; Dec. 5, 1998.*

"Communicating With Claiborne: The Net Effect;" Women's Wear Daily, v175, n36, p. 30; Feb. 25, 1998.*

"Computer Dictionary, Second Edition;" Microsoft Press; EXCERPT; p. 418-419; 1994.*

* cited by examiner

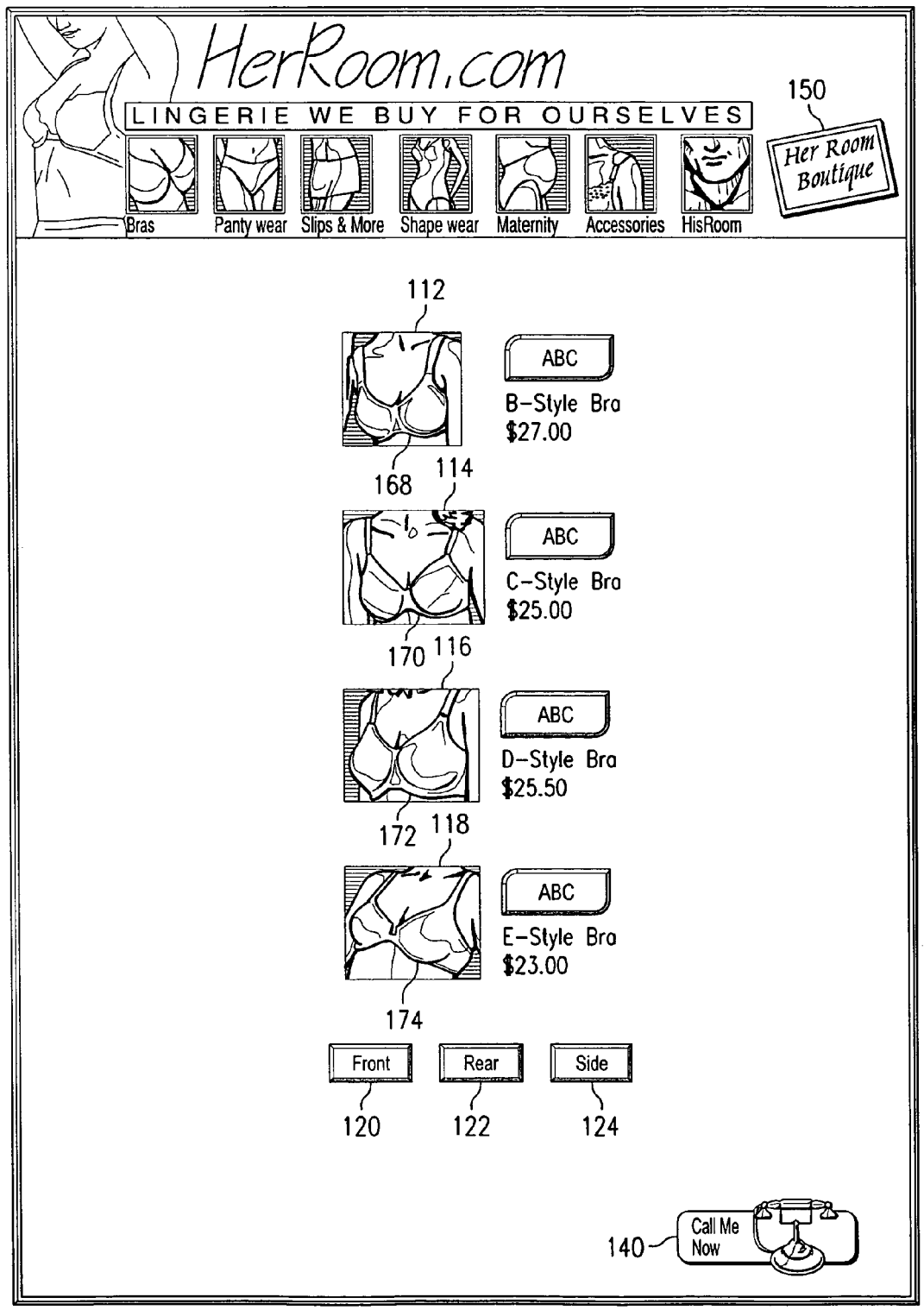

FIG. 4

HerRoom.com
LINGERIE WE BUY FOR OURSELVES

Bras | Panty wear | Slips & More | Shape wear | Maternity | Accessories | HisRoom Her Room Boutique

ABC

B-Style Bra
Brand Profile

Blueprint
Click to get a measurement grid

THE FITTING ROOM
Click to see how it looks with these necklines:

88 — button down
89 — scoop neck
90 — boat neck
91 — square neck
92 — deep v-neck
93 — cutaway tank

*Product Description*

B-Style Bra
- Floral satin minimizer with comfort straps.
- Superior bust reduction
- Minimizes with shape for a flattering silhouette.
- Seamed, non-stretch satin delustered cups with coushion-tipped underwire for support and comfort.
- Comfort straps prevent shoulder irritation and reduce strain.

*Fitter's Comments*

Call Me Now

- Floral satin minimizer with comfort straps.
- Underwire minimizer reduces up to 1-3/4".
- Back panels are breathable.
- Side seams are 3-1/2" wide.
- Contoured and padded 3/4" straps adjust in back.
- Three row, three column hook and eye closure.

FIG. 5

HerRoom.com
LINGERIE WE BUY FOR OURSELVES

Bras | Panty wear | Slips & More | Shape wear | Maternity | Accessories | HisRoom Her Room Boutique

ABC

B-Style Bra
Brand Profile

Blueprint
Click to get a measurement grid

THE FITTING ROOM
Click to see how it looks with these necklines:

88 button down | 89 scoop neck | 90 boat neck | 91 square neck | 92 deep v-neck | 93 cutaway tank

Product Description
B-Style Bra
- Floral satin minimizer with comfort straps.
- Superior bust reduction
- Minimizes with shape for a flattering silhouette.
- Seamed, non-stretch satin delustered cups with coushion-tipped underwire for support and comfort.
- Comfort straps prevent shoulder irritation and reduce strain.

Fitter's Comments

Call Me Now

- Floral satin minimizer with comfort straps.
- Underwire minimizer reduces up to 1-3/4".
- Back panels are breathable.
- Side seams are 3-1/2" wide.
- Contoured and padded 3/4" straps adjust in back.
- Three row, three column hook and eye closure.

FIG. 6

VIRTUAL SHOWROOM METHOD

RELATED APPLICATION

This application claims the benefit of U.S. provisional appl. Ser. No. 60/184,789, filed Feb. 24, 2000, entitled VIRTUAL SHOWROOM SYSTEM AND METHOD.

TECHNICAL FIELD OF THE INVENTION

The present invention relates to electronic commerce and, in particular, to a virtual showroom system and method.

BACKGROUND OF THE INVENTION

The recent increase in PC owners and simplified access to the Internet and other "dial-up" network services have provided enhanced opportunities for on-line sales. E-commerce, in the form of business to business and business to consumer sales has become the method of choice for many buyers and sellers of services and merchandise. Furthermore, improved video graphics allow buyers to view and evaluate potential purchases more thoroughly, prior to purchase. Many buyers remain cautious, however, and avoid on-line purchases involving tangible, personal products which traditionally require a more thorough, in-person inspection. Existing technology does not provide a buyer with sufficient opportunity to adequately evaluate such items prior to purchase.

SUMMARY OF THE INVENTION

An object of the present invention is to improve the quality of the electronic commerce experience, and in particular, to provide a virtual showroom which allows a user to more thoroughly evaluate articles and products for potential purchase. Another object is to enhance the quality of electronic communication and graphics exchanged between a network server and a client system(s). Yet another object is to simplify the selection, purchasing and customer support provided by a network server. Still another object is to provide an expedient, reliable, cost-effective and user-friendly electronic commerce platform.

The foregoing objects are attained in accordance with the present invention by employing a network server with enhanced graphics and improved methods for displaying articles offered for purchase, to allow a purchaser to fully evaluate the article while shopping "on-line." In a particular embodiment, a virtual showroom associated with the network server may be provided, for displaying first and second articles. A first electronic image representing the first article and a second electronic image representing the second article may also be provided. The second article may be complementary to the first article, such that the second article may be worn in conjunction with the first article. In one embodiment, a user may have the option to overlay the first electronic image with the second electronic image.

In a particular embodiment, the second electronic image may include an at least partially translucent depiction of a substantial portion of the second article. In another embodiment, the second electronic image may include a line-drawing which displays an outline of the second article. A third electronic image including the second electronic image overlaying the first electronic image may be stored within a database accessible by the network server.

In still another embodiment, the first electronic image may be provided within a master display field. A plurality of graphical objects, each object representing a respective complementary article may also be provided, wherein a user may select one of the complementary articles for display with the first article. In the same embodiment, a second electronic image which represents the complementary article selected by the user, overlaying the first electronic image, may be provided in the master display field.

A technical advantage of the present invention includes the ability of the user to more fully evaluate the articles prior to purchase.

Another technical advantage includes the ability of the user to view images of an article(s) concurrently with an electronic overlay of complementary article(s).

Other technical advantages are readily apparent to one skilled in the art from the following figures, description, and claims.

BRIEF DESCRIPTION OF THE DRAWINGS

For a more complete understanding of the present invention, and for further features and advantages, reference is now made to the following description, taken in conjunction with the accompanying drawings, in which:

FIG. 3B is a schematic drawing illustrating another alternative embodiment of the virtual showroom of FIG. 2;

FIG. 4 is a schematic drawing illustrating another alternative embodiment to the virtual showroom of FIG. 2;

FIG. 5 is a schematic drawing illustrating another alternative embodiment to the virtual showroom of FIG. 2;

FIG. 6 is a schematic drawing illustrating an alternative embodiment to the virtual showroom of FIG. 2;

DETAILED DESCRIPTION OF THE INVENTION

Figure 1:
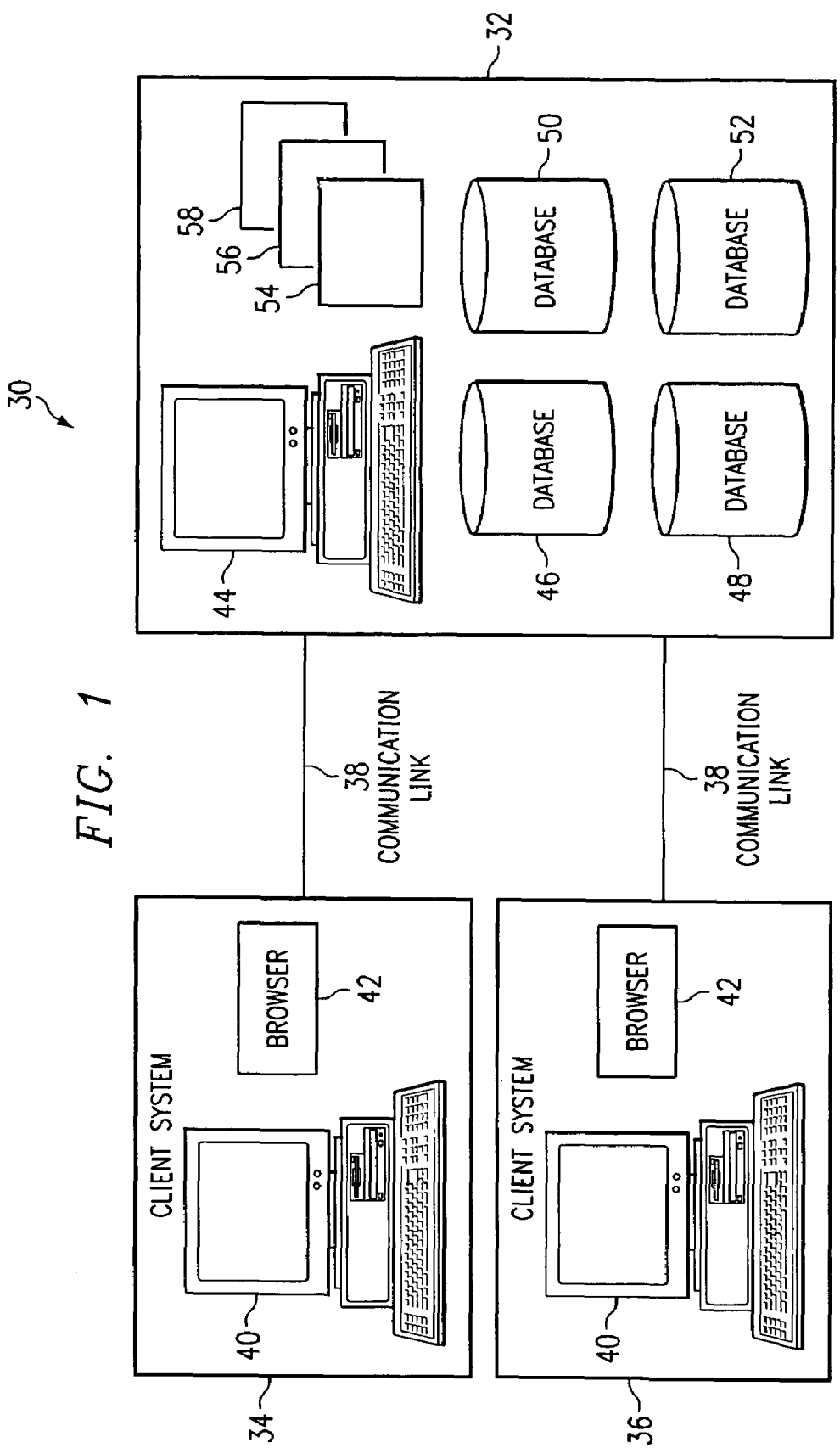
FIG. 1 is a schematic drawing illustrating a computer network configuration suitable for use within one aspect of the present invention.

Referring to FIG. 1, a computer network is provided and generally designated by the reference numeral 30. Network 30 includes a network server 32 and a plurality of client systems 34 and 36. Each client system 34, 36 may be coupled with network server 32 via respective communication links 38. In one embodiment, network server 32 may include, and/or be coupled with an internet or, more particularly, the World Wide Web. However, network server 32 may also include and/or be coupled with any "dial-up" service provider. In general, network server 32 may be any platform which allows a user of client system 34 and/or 36 to electronically communicate with network server 32 through communication link 38.

Client systems 34 and 36 each include a respective computer terminal 40, or other medium for accomplishing electronic communication. Terminal 40 may include specific software including a browser 42 which allows standardized communication with network server 32.

Communication link 38 may include practically any available communication system including, but not limited to wireless, wireline, twisted pair, coaxial cable, T1, and/or digital subscriber lines (DSLs). The present invention will primarily be described with regard to web pages viewed by the user of a personal computer (PC) in communication with a network server of the World Wide Web. It will be recognized by those of ordinary skill in the art that the teachings of the present invention apply equally as well with any form of electronic communication between computer systems. Similarly, any reference to a web page shall include any interactive display available to a user of a network server.

In the illustrated embodiment, network server 32 includes a graphical user interface (GUI) 44 to allow a network operator to monitor server 32, perform data entry functions, programming, and communicate with users of network server 32. One or more databases 46, 48, 50 and 52 may also be provided in order to store particular information including inventory, customer information, accounting information, product descriptions, etc. Network server 32 may also include software, and a plurality of web pages 54, 56 and 58 in order to communicate with and/or display information to users of client systems 34 and 36. Web pages 54, 56 and 58 may contain dynamic content, such that the contents of a given web page may change over time, or in response to an electronic request and/or selection by a user. Alternatively, the content of web pages 54, 56 and 58 may change automatically according to parameters received from server 32 or an operator of server 32.

Figure 2:
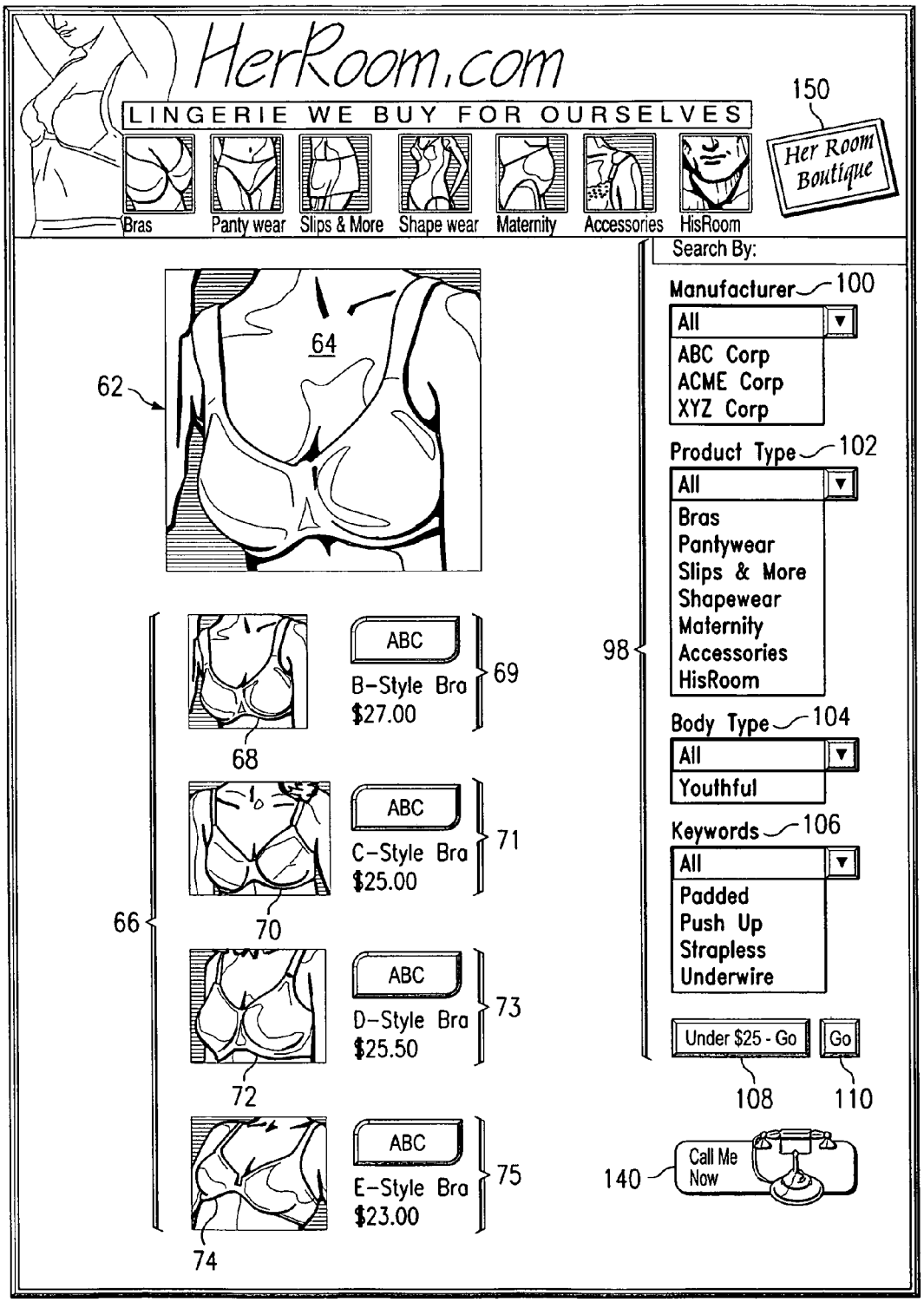
FIG. 2 is a schematic drawing illustrating a virtual showroom suitable for use within the teachings of the present invention.

In one embodiment, network server 32 may be operated by a seller of articles of clothing including, but not limited to bras, pantywear, slips, shapewear, maternity clothing, accessories, shirts, pants and outer wear. Referring to FIG. 2, web page 54 may include a virtual showroom 60 containing product information and electronic images of these various articles. Virtual showroom 60 includes a master display field 62 capable of displaying a large electronic image, for example, image 64. Throughout this application, reference will be made to products, articles, garments, undergarments, outer wear and other tangible items contained within web pages and, more specifically, a virtual showroom. It will be recognized by those of ordinary skill in the art that such reference will indicate an electronic image of the associated tangible item displayed on the web pages, rather than the item itself.

Web page 54 includes a search field 98 which provides a user with various search criteria, to assist the user in finding particular articles and products of interest. For example, a user of network server 32 may select one of icons 100, 102, 104 or 106 to conduct a search specific to a particular manufacturer 100, product type 102, body type 104 or a keyword search 106. Each icon 100, 102, 104 and 106 includes a respective field of pre-selected terms available to a user for conducting a search. In one embodiment, an "under $25—go" icon 108 may also be provided. A user may select one or more of various search criterion 100, 102, 104 or 106 to conduct a specific search as desired by the user. In order to execute the search, the user needs only select the "GO" icon 110 and server 32 will search database 46, 48, 50 and/or 52 (FIG. 1) for articles matching the specified criteria. Alternatively, after specifying search criterion from fields 100, 102, 104 and/or 106, the user may select "under $25—GO" icon 108. This will automatically add to the search criterion that the price of the articles or products must be equal to, or less than $25. Accordingly, network server 32 will search databases 46, 48, 50 and/or 52 for articles or products which match the criteria of fields 100, 102, 104 and/or 106, and include a price equal to or less than $25.

In a particular embodiment of the present invention, a user may select one of many images to be displayed within master display field 62. For example, a display field 66 featuring various electronic images of various articles may be provided and may include undergarments 68, 70, 72 and 74, with associated product descriptions 69, 71, 73 and 75. This allows a user to view thumbnail electronic images of undergarments 68, 70, 72 and 74, and review various details regarding each particular product contained within product descriptions 69, 71, 73 and 75. A user may select one of undergarments 68, 70, 72 and 74, for display within master display field 62 by "clicking on" the graphical object, or icon which represent any of undergarments 68, 70, 72 and 74. Once a user "clicks" upon a particular undergarment, that particular undergarment becomes the featured undergarment, and a larger electronic image of the featured undergarment is displayed within master display field 62. For example, master display field 62 may originally be left blank when web page 54 is displayed to the user. Upon selection of a featured undergarment, for example undergarment 68, a larger electronic image representing undergarment 68 may be displayed within master display field 62. This provides the user with a larger image in order to more thoroughly evaluate the featured undergarment.

A large product description field 72 (FIG. 4) may also be provided. When a user selects a featured article, for example undergarment 68, a thorough description of undergarment 68 may appear within product description field 77. The product description field provides more detailed information regarding a given article than available through product descriptions 69, 71, 73 and 75.

In the illustrated embodiment, the undergarment displayed within master display field 62 is depicted upon a mannequin or human form. This allows a user of server 32 to evaluate the undergarment more thoroughly. In another embodiment, an actual photograph or other depiction of a human may be used within display field 62, to illustrate a particle article (i.e., undergarment 68).

Figure 2A:
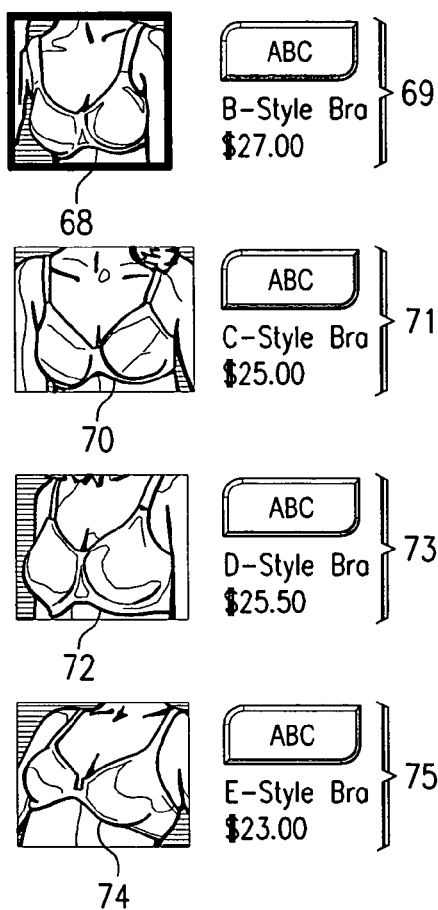
FIG. 2A is a schematic drawing illustrating a display field containing graphical objects.

Field 66 may include a method to distinguish the featured, or selected undergarment 68, with a distinctive characteristic from the non-featured undergarments. In the example described above, undergarment 68 would be considered the featured undergarment and displayed within master display field 62. Accordingly, undergarments 70, 72 and 74 would be considered the non-featured electronic thumbnail images. In order to distinguish undergarment 68 from non-featured undergarments 70, 72 and 74, the thumbnail image of undergarment 68 may be provided in a different color scheme, for example, black and white and/or shaded, to indicate the selection of undergarment 68 as the featured image. In the same embodiment, undergarments 70, 72 and 74 may be provided in color. Alternatively, featured undergarment 68 may be provided in color, to indicate its selection as the featured image, and non-featured undergarments 70, 72 and 74 may be provided in black and white. FIG. 2A illustrates a method to distinguish featured undergarment 68 from non-featured undergarments 70, 72 and 74, using shading.

Figure 2B:
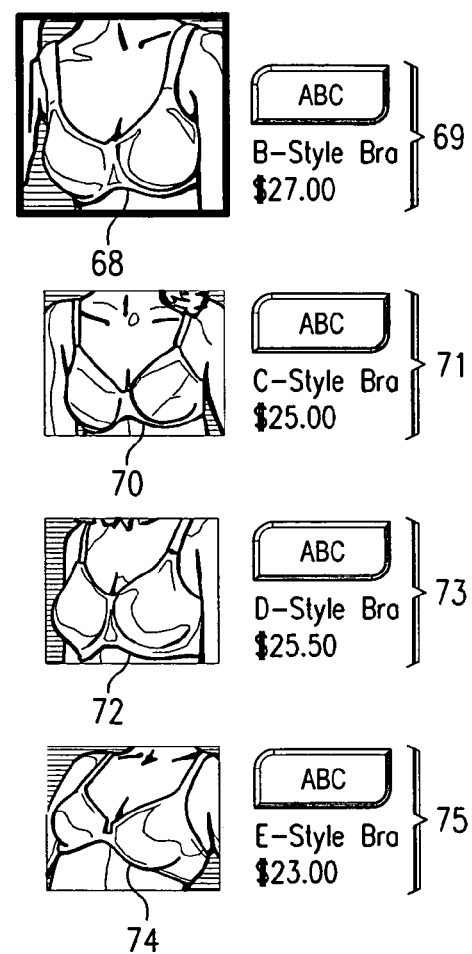
FIG. 2B is a schematic drawing illustrating an alternative embodiment display field.

In yet another embodiment, featured undergarment 68 may include another distinctive characteristic, instead of its associated color scheme. For example, the electronic thumbnail image of featured undergarment 68 may be provided in a size larger than electronic thumbnail images of undergarments 70, 72 and 74 within field 66 (see FIG. 2B). This allows a user to view field 66 and immediately determine which undergarment is the featured undergarment currently being displayed within master display field 62. Alternatively, the size of featured undergarment 68 may be reduced with respect to undergarments 70, 72 and 74 within field 66, after selection of undergarment 68 as the featured image.

Customer support provided by the operator of network server 32 is imperative to the successful operation and maintenance of virtual showroom 60. Accordingly, an icon entitled "call me now" 140 may be provided upon web page 54. Selection by the user of the "call me now" icon 140 will immediately initiate a message to the operator indicating that the user requires customer support. In one embodiment, this allows the operator to immediately place a telephone call to the user to address any questions or comments of the user. Personal information regarding each particular user including, but not limited to telephone number, name, age and preferences may be stored within any of databases 46, 48, 50 and/or 52 and made available to the operator immediately upon selection of the "call me now" icon 140, by the user.

Figure 3:
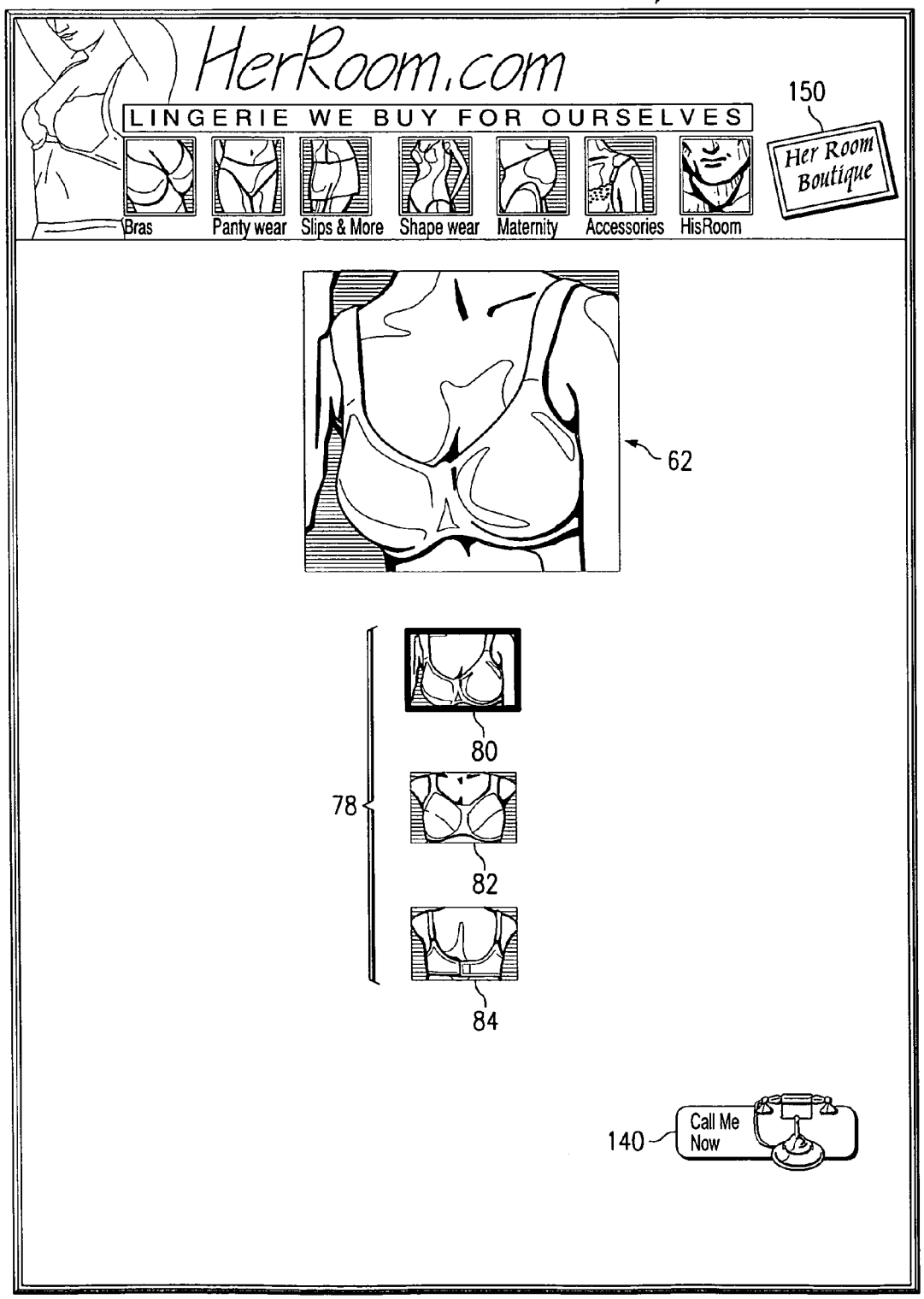
FIG. 3 is a schematic drawing illustrating an alternative embodiment of the virtual showroom of FIG. 2.

Referring now to FIGS. 2 and 3, a second field 78 including electronic thumbnail images 80, 82 and 84, each thumbnail image representing a different view of the same article, may also be provided. For example, electronic thumbnail image 80 may portray a front view of a particular article, while electronic thumbnail images 82 and 84 include rear and side (off-center) views of the same article. Once a user has selected a particular article based upon electronic thumbnail images 68, 70, 72 and 74, and their respective associated product descriptions 69, 71, 73 and 75, a particular product may be displayed within master display field 62. Accordingly, electronic thumbnail images 80, 82 and 84 may represent various views of whichever article that is being displayed within master display field 62.

In a particular embodiment, when an article is selected from field 66 to be displayed in master display field 62, a default command may cause a front view of the selected article to be displayed within master display field 62. A user may then view various other views of the same article by clicking upon thumbnail images 80, 82 and 84 in order to gain a more thorough perspective of the product. In practice, a user may select electronic thumbnail image 82 which portrays a rear view of a particular product, and the rear view of that product will be displayed within master display field 62. In this case, rear view electronic thumbnail image 82 will be considered the featured, or selected view. In a similar manner, the views depicted by electronic thumbnail images 80 and 84 would be considered non-featured images of field 78. In a similar manner to that described above with respect to featured electronic thumbnail image 68, electronic thumbnail image 82 may also include a distinctive characteristic in order to indicate that it is currently the featured electronic thumbnail image of field 78. The distinctive characteristic may also include various color schemes or the size of the particular thumbnail images, as described above. In the embodiment of FIG. 3, electronic thumbnail image 80 is the featured image, and displayed within master display field 62.

At any time while viewing web page 54, the user may change the electronic thumbnail image currently being displayed within master display field 62, simply by clicking upon a different image, for example one of undergarments 70, 72 or 74. If the user clicks on undergarment 74, for example, undergarment 74 would be displayed within master display field 62, instead of undergarment 68. Accordingly, undergarment 74 would become the featured electronic thumbnail image, and undergarments 68, 70 and 72 would be considered non-featured thumbnail images. Upon selection of undergarment 74 by a user, rear, front and side views of undergarment 74 would automatically be displayed within field 78. In a similar manner, a user may change the perspective view of the product being displayed within master display field 62 by clicking on a different electronic thumbnail image 80 or 82. If a user selected electronic thumbnail image 82, for example, the view associated with electronic thumbnail image 82 would be displayed within master display field 62. Thus, electronic thumbnail image 82 would become the featured image, and images 80 and 84 would be considered non-featured thumbnail images.

Figure 3A:
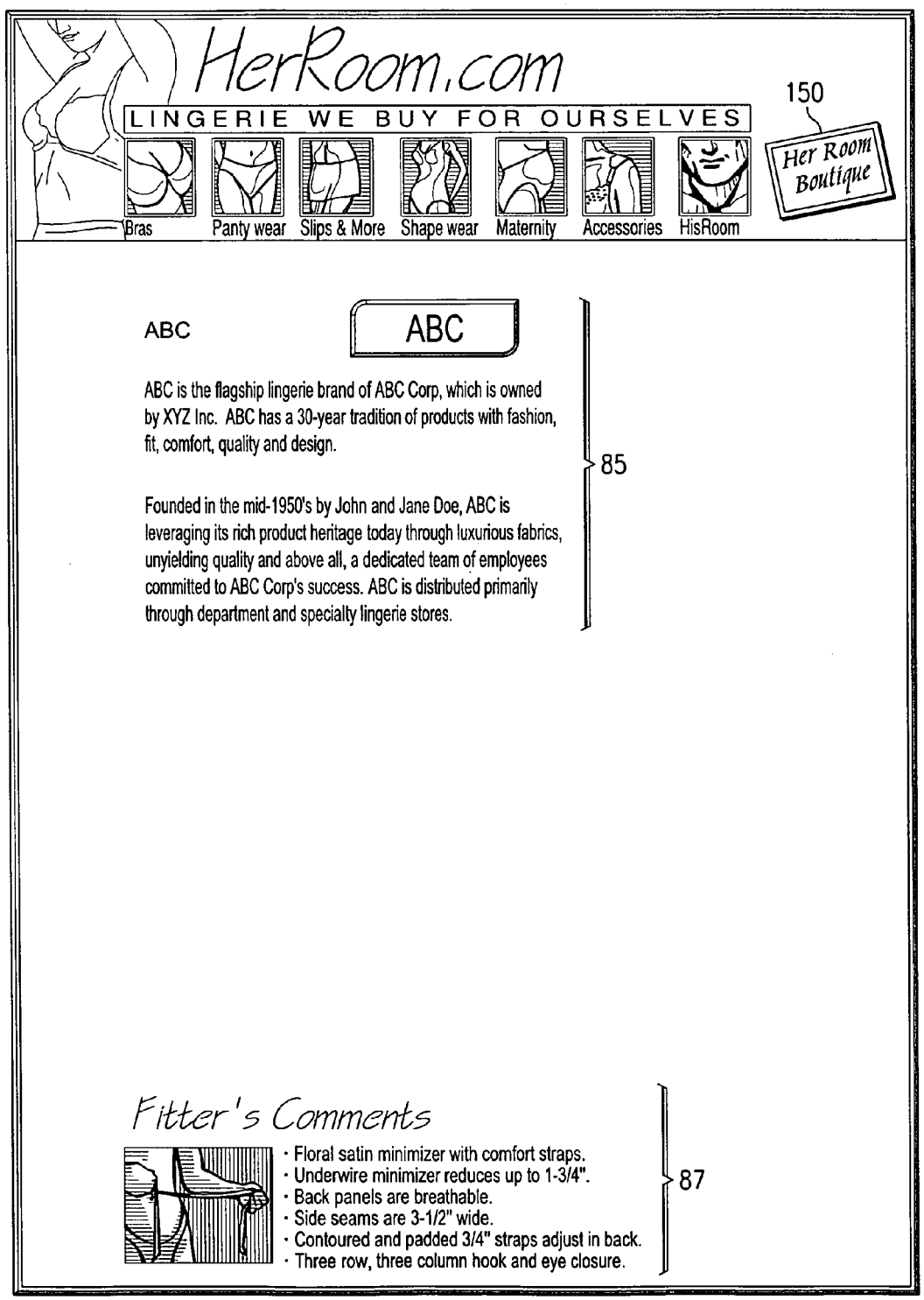
FIG. 3A is a schematic drawing illustrating another alternative embodiment of the virtual showroom of FIG. 2.
Figure 3C:
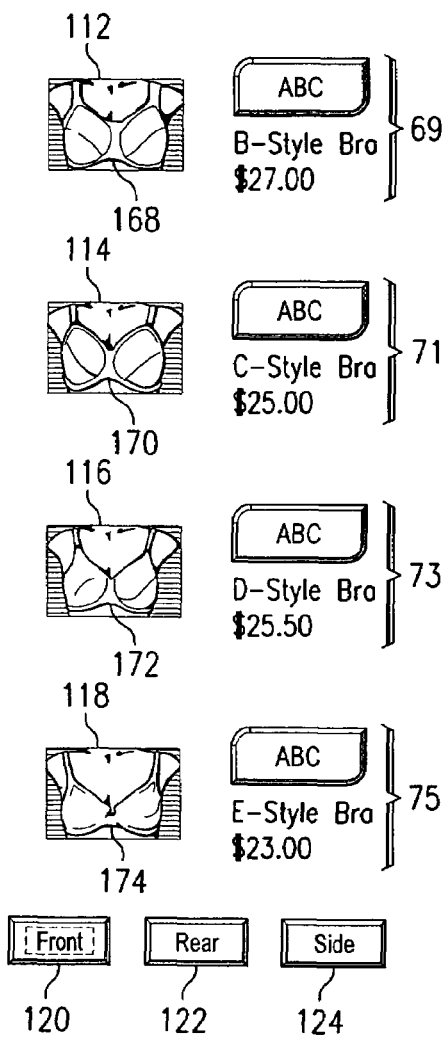
FIG. 3C is a schematic drawing illustrating a display field for use with the virtual showroom of FIG. 2.

A text display field indicating "fitters comments" 87 may also be provided to assist the user in evaluating the featured undergarment displayed within master display field 62. Fitters comments 87 provide a subjective analysis of the featured product which may not otherwise be available by viewing an electronic image. Fitters comments 87 may include an analysis of a particular article from the manufacturer, supplier, network operator and/or any other clothing professional. As illustrated in FIG. 3A, fitters comments may indicate particular qualities including, but not limited to, configuration, comfort, fabric analysis, measurements, operation and/or accessories.

Information regarding the manufacturer of the featured undergarment displayed within master display field 62 may also be provided in a text display field entitled company information 85 (FIG. 3A). This information may be stored within any of databases 46, 48, 50 and/or 52 (FIG. 1), and automatically made available to the user through the company information text field 85, upon selection of a featured article. Information regarding the manufacturer of a particular article may be useful to a user in evaluating a particular product, and may also provide information regarding the history, customer service, statistical data, and reputation of the manufacturer of the product.

Web page 54 may also provide a user with the ability to view a plurality of garments from several similar perspectives, simultaneously. As illustrated in FIG. 3B, a plurality of display windows 112, 114, 116 and 118, may be provided. A user who is evaluating certain articles, may select certain articles for display within display windows 112, 114, 116 and 118. For example, a user may select electronic images of undergarments 168, 170, 172 and 174 for display within windows 112, 114, 116 and 118, respectively. Initially, each undergarment 168, 170, 172 and 174 may be displayed from a side, or isometric type perspective, as depicted in FIG. 3B. A plurality of icons indicating front 120, rear 122, and side 124 are also provided. A user has the option of viewing any associated perspective of undergarments 168, 170, 172 and 174, simultaneously, upon selection of any one of front icon 120, rear icon 122, and side icon 124.

Figure 3D:
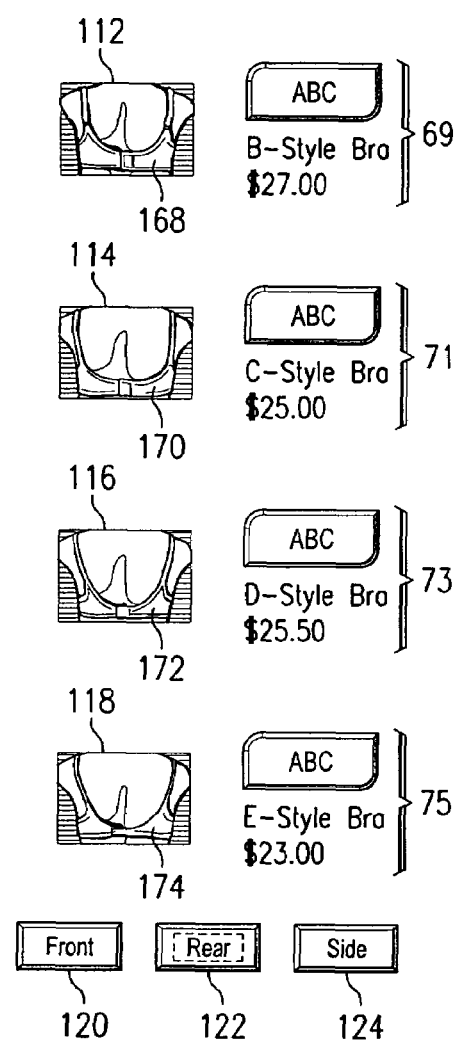
FIG. 3D is a schematic drawing illustrating an alternative embodiment display field for use with the virtual showroom of FIG. 2.

In practice, after a user has selected undergarments 168, 170, 172 and 174 for viewing within display windows 112, 114, 116 and 118, respectively, a default view illustrating the front perspective of each undergarment 168, 170, 172 and 174 may be provided. Upon selection of a different perspective, for example, rear icon 122, a rear perspective of each undergarment 168, 170, 172 and 174 will be provided, simultaneously, as illustrated in FIG. 3D. Similarly, a user may select any of front, rear, and side perspectives and that particular perspective of each undergarment 168, 170, 172 and 174 will be displayed within their associated display windows 112, 114, 116 and 118, respectively. This feature allows a user to simultaneously display and evaluate a plurality of undergarments from different perspectives.

Referring to FIGS. 4 and 5, a fourth field 86 representing various complementary articles, or articles which may be worn with, or over the product being displayed within master display field 62 may be provided. For example, outer garments 88-93 each includes distinctive characteristics, for example neck-line, sleeve length, and sleeve location. A user of web page 54 may click on one of outer garments 88-93 of field 86 in order to select a particular type of clothing to view concurrently with any of undergarments 68, 70, 72 and 74. In one embodiment, a user may select the electronic thumbnail image of undergarment 70 for display within master display field 62. This will cause an enlarged image of undergarment 70 to appear as electronic image 64. Next, a user may select any of field 86, for example outer garment 93 which illustrates a "cutaway tank" shirt. Once selected, an electronic image of article 93 will overlay the electronic image of undergarment 68 within master display field 62, as illustrated in FIG. 4. A user may then select any of the remaining outer garments 88-92, in order to replace the image of outer garment 93 within master display field 62, with another overlay image of one of outer garments 88-92. Through this specification, the terms overlap and overlaying should not be limited to placing a specific image over another specific image, or vice versa. Many techniques are available to combine electronic images in a manner traditionally referred to as an overlay image. Overlaying simply refers to arranging two or more electronic images together such that certain characteristics from each image are visible within an electronic display.

A user may continue in this fashion selecting any of articles 88-93 within field 86 for display within master display field 62. As previously discussed with regard to field 66 and field 78, outer undergarments 88-93 of field 86 may include a distinctive characteristic in order to distinguish the selected, or featured outer garment 93 from the remaining non-featured outer undergarments 88-92. The distinctive characteristic may include the featured outer undergarment 93 appearing in a different size than the non-featured outer garments 88-92. Alternatively, a different color scheme may be provided for all non-featured outer garments 88-92, with respect to the featured article.

In still another embodiment, the selection of one of outer garments 88-93 from field 86 by a user will provide a "line drawing" 88a illustrating an outline of the featured outer garment from field 86, overlaying the product within master display field 62 (FIG. 5). Line drawing 88a allows a user to fully evaluate certain characteristics inherent with the featured outer garment from field 86 with regard to the featured undergarment displayed within master display field 62, and does not require that a full image of the featured outer garment from field 86 be displayed within master display field 62. Accordingly, a user may evaluate the coordinated image of the undergarment and line drawing to determine critical characteristics including strap location, strap width, neckline, sleeve location and sleeve length to determine the suitability of a particular undergarment with a particular outer garment. FIG. 5 illustrates a line drawing 88a of featured outer garment 88 overlaying featured undergarment 68 within master display field 62.

Figure 6:
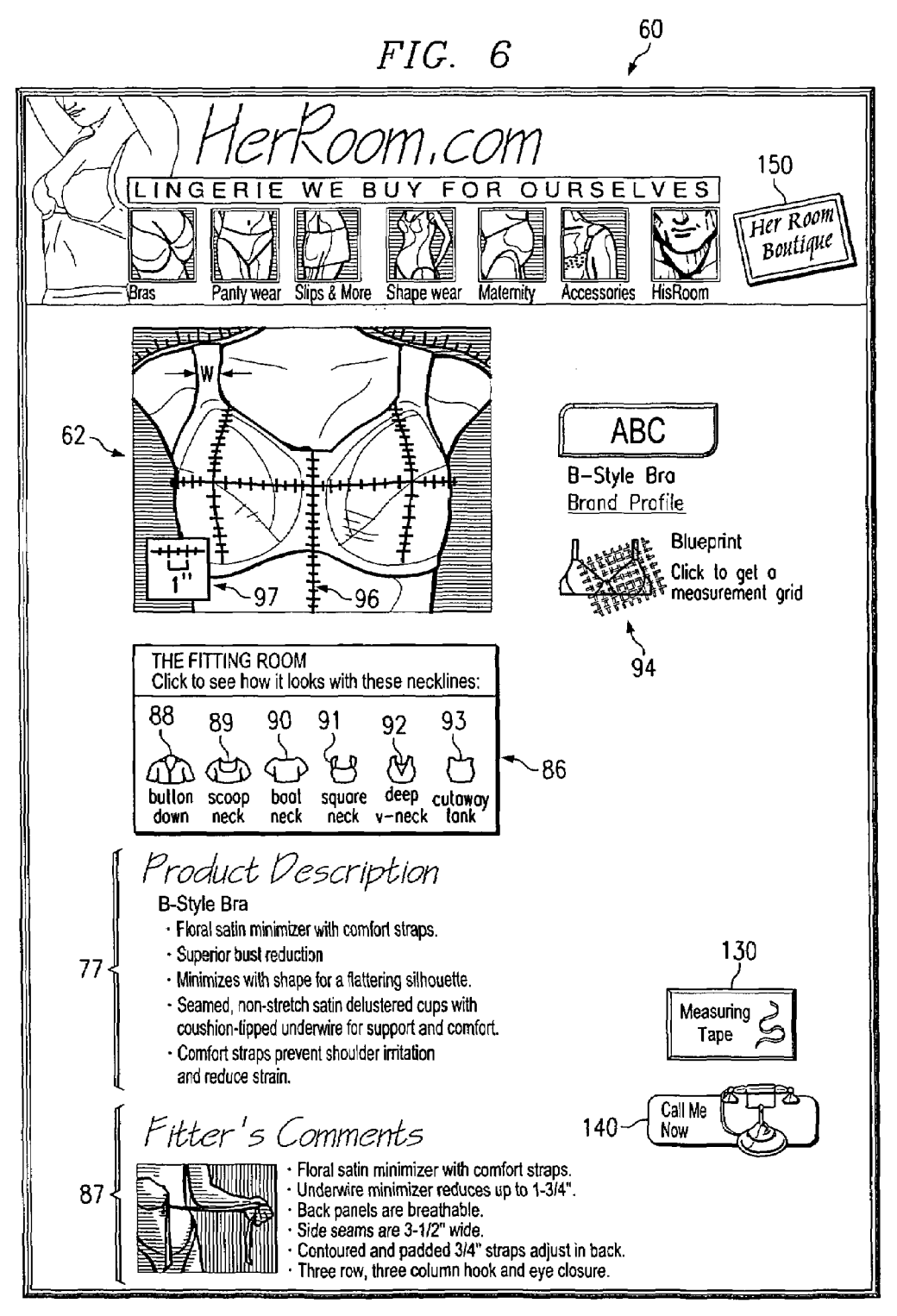

Referring now to FIG. 6, web page 54 may also include an icon entitled "blueprint" and generally designated by the reference numeral 94. Selection of blueprint icon 94 by a user will provide a blueprint, scaled-map 96 overlaying any image within master display field 62. Scaled map 96 conforms to critical contours of the particular article it overlays. For example, scaled map 96 follows the contours of the human shoulder for simplified evaluation of strap width W of the illustrated article. Furthermore, scaled map 96 provides a three-dimensional image which allows a user to determine depth, for example, the protrusions at the "cups" of the illustrated bra. Overall, this allows a user to evaluate measurements of various article characteristics including, but not limited to, sleeve length and strap width. A scale 97 may also be provided to illustrate the exact dimensions associated with scaled map 96.

In one embodiment scaled map 96 may be aligned with and tailored to the particular article being displayed within master display field 62. This ensures that various benchmarks within scaled map 96 line up appropriately with certain elements of the undergarment on display within master display field 62. Otherwise, blueprint scaled map 96 may be provided in a generic scale or grid, suitable to evaluate any article displayed within master display field 62.

Figure 7:
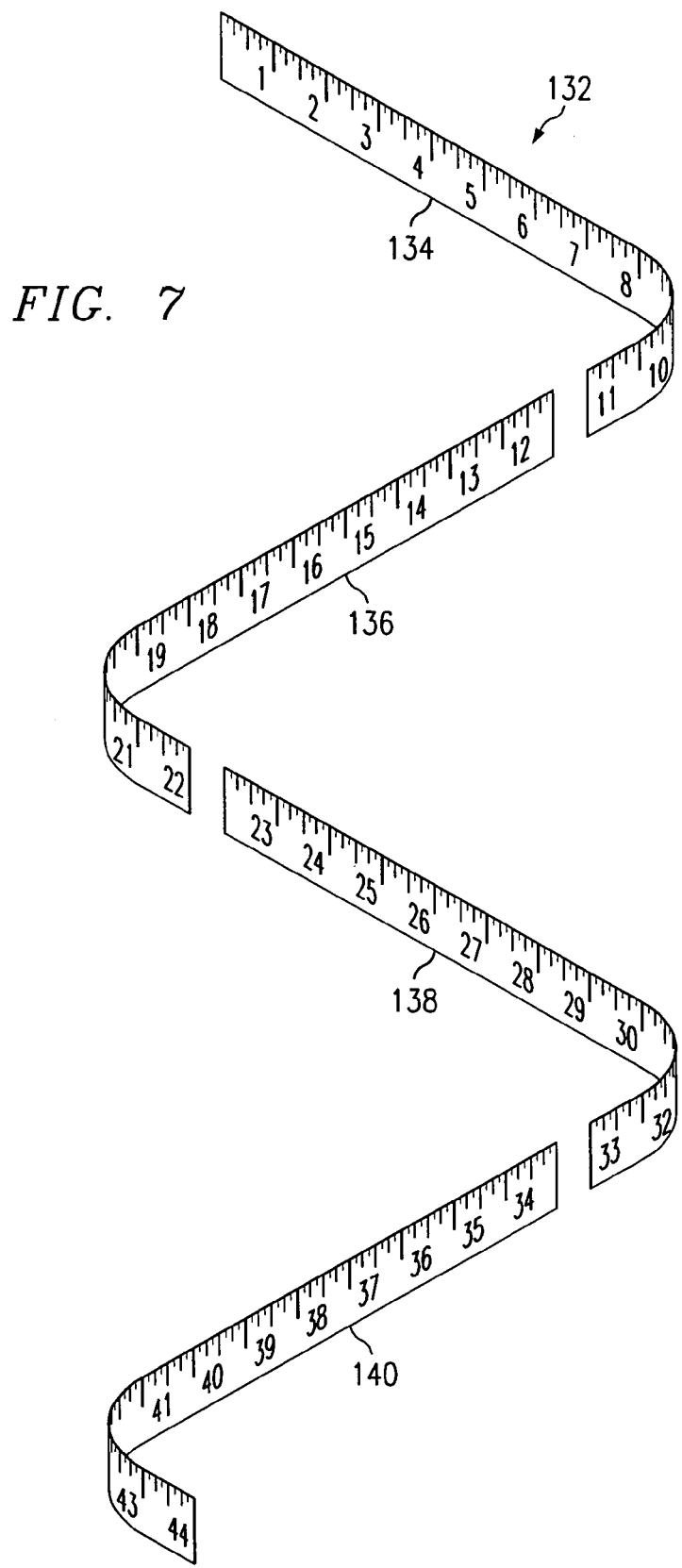
FIG. 7 is a schematic drawing illustrating a tape measure for use within the teachings of the present invention.
Figure 8:
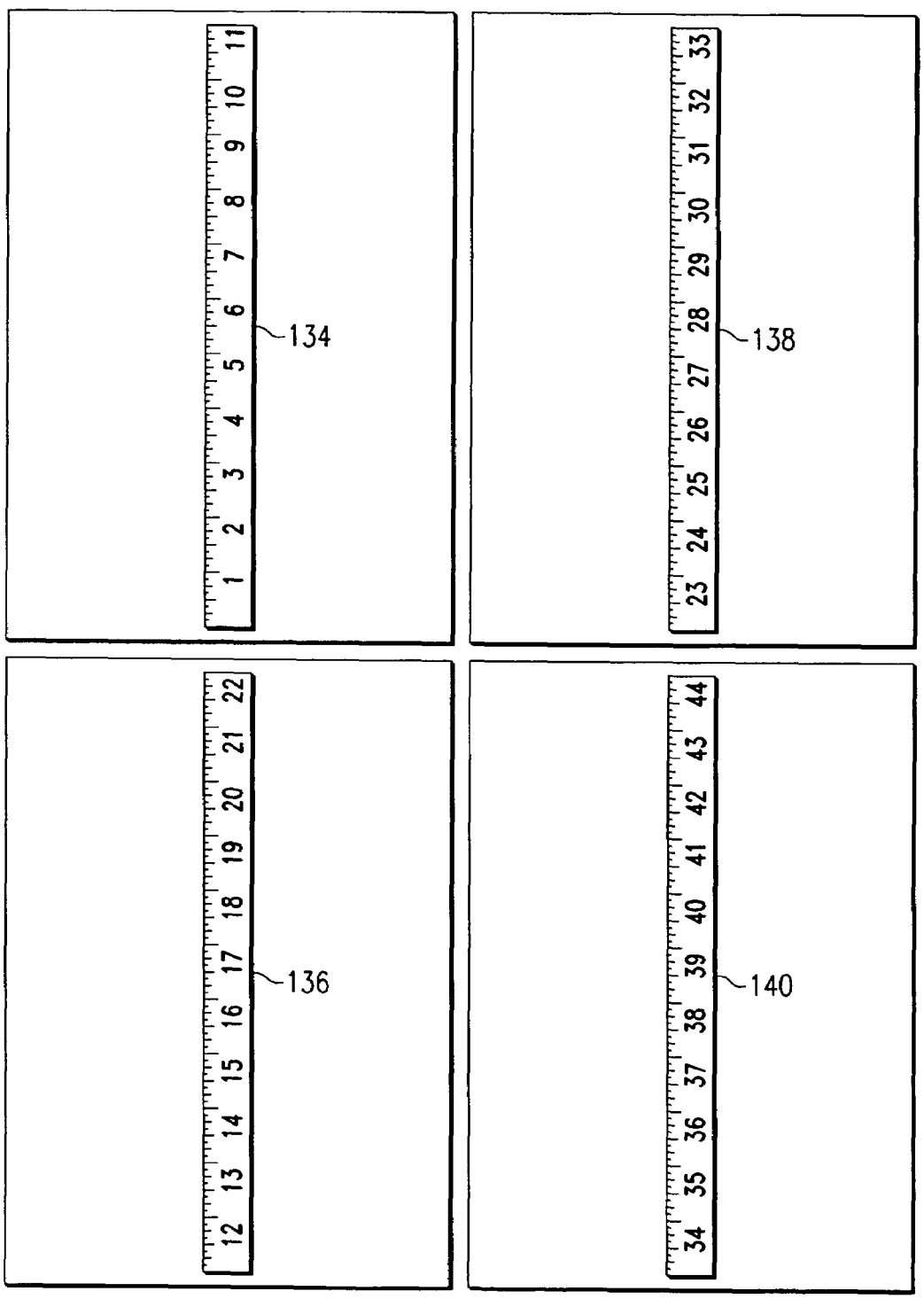
FIG. 8 is a schematic drawing illustrating portions of the tape measure of FIG. 7.
Figure 9:
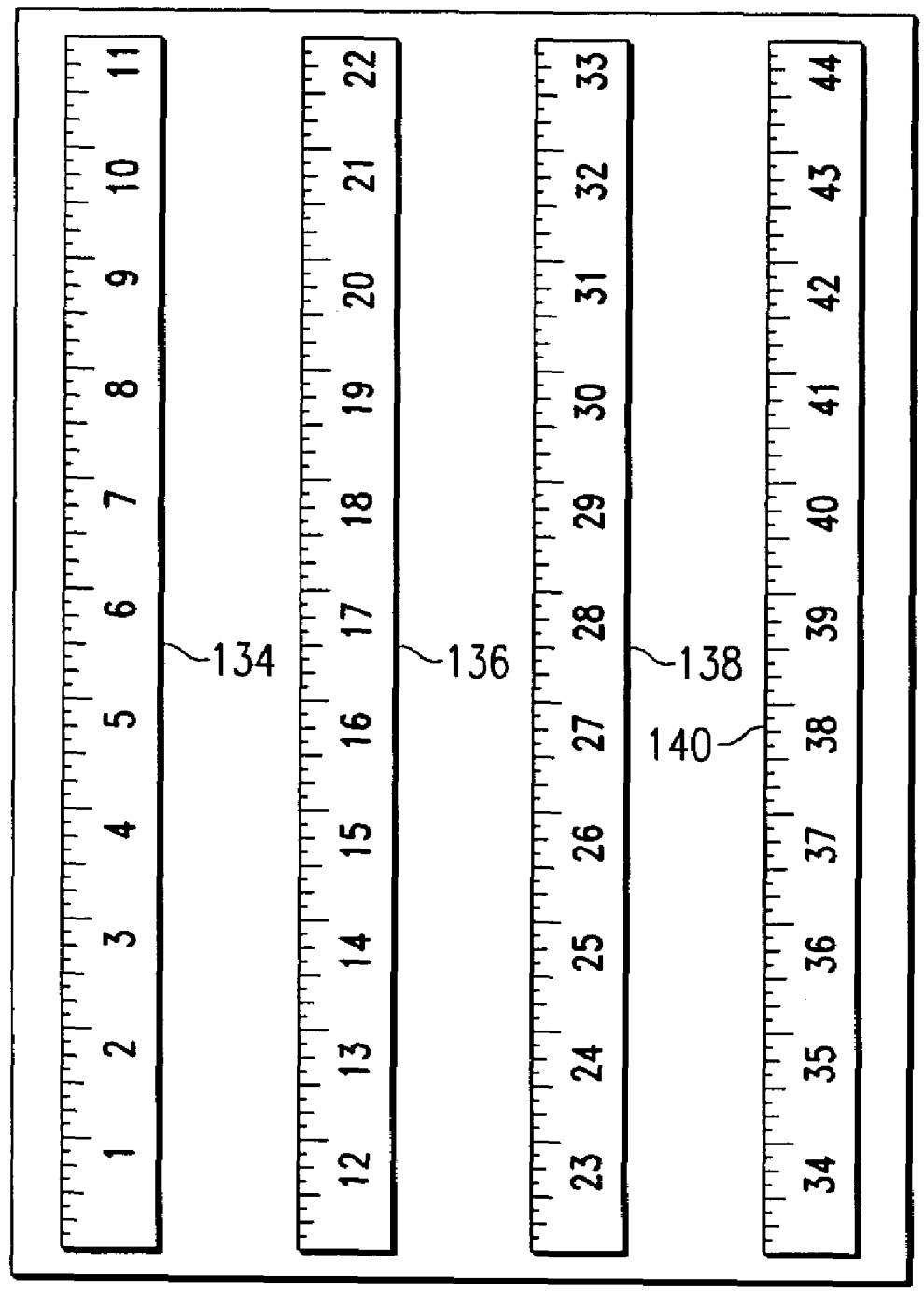
FIG. 9 is a schematic drawing illustrating an alternative embodiment to the sections of tape measure of FIG. 8.

Certain physical characteristics and measurements of a particular user are very important in their selection and evaluation of any particular product. Accordingly, web page 54 provides the ability of the user to print out a hard copy of a scale, or tape measure in order to determine these physical characteristics and measurements. A graphical object entitled measuring tape 130 is available to the user. Selection of measuring tape icon 130 will distribute an electronic image of a tape measure 132 of an appropriate scale to perform this evaluation, for printing by the user. FIG. 7 illustrates one particular embodiment of the printable tape measure 132 available to the user. In order to extend the length of tape measure 131, sections 134, 136, 138 and 140 of tape measure 132 may appear on consecutive pages for assembly by the user, as illustrated in FIG. 8. In another embodiment, sections 134, 136 and 138 of tape measure 132 may appear on a single page (FIG. 9). In this embodiment, a user may "cut and paste" sections 134, 136 and 138 together to form tape measure 132.

As previously discussed, databases 46, 48, 50 and 52 (FIG. 1) may be used to store information regarding sales, accounting, user profiles, manufacturers, products and security. By collecting, storing and utilizing information regarding particular users, the operator of network server 32 may optimize sales techniques, and offer methods of electronic commerce previously unavailable. For example, each time a user purchases a particular article, the user's information and profile of the particular article may be stored within a database, i.e., database 46. This information may then be used by the operator to notify the user, or purchaser of a particular product(s) regarding the occurrence of a specified event. In one embodiment, the operator may configure the network server to formulate a warning message whenever low inventory of a particular product is detected. Upon receiving this message, the network operator may initiate a message sequence wherein each purchaser of that particular product is notified that supply will be limited. In an alternative embodiment, network server 32 may be configured to contact the user directly, upon the occurrence of the particular event. This notification allows a user to purchase additional quantities of the particular product before the inventory is exhausted.

In a similar manner, the network operator may use this notification system to alert purchasers of a particular product that said product is being discontinued by the manufacturer and/or supplier. Upon receiving notification from the manufacturer and/or supplier, that a particular article will be discontinued or unavailable in the future, the network operator may initiate a message sequence wherein each purchaser of that product is notified. In the illustrated embodiment, an electronic message alerting each purchaser of the low inventory, or discontinuation status of the product, may be forwarded to each purchaser. In another embodiment, the network operator's notification to the purchaser may take the form of a telephone call prompted by network server 32 which furnishes the purchaser with a pre-recorded message regarding the status of the article. Alternatively, the network operator may place a live telephone call to the purchaser, or mail a hard copy notification of the status of the article.

In still another embodiment, the specified event may include a discounted price, or closeout sale of a particular article. Upon notification from the manufacturer to the network operator that a particular item will be subject to a closeout sale, or any discount, the network operator may provide each purchaser of the particular article with such information. Network server 32 may be pre-programmed to accept such information regarding a specified event for a particular product, including a closeout sale, low inventory or discontinuation. Upon receipt of such information, network server may be configured to automatically distribute notifications via electronic messages and/or pre-recorded telephone notification to each purchaser of the product. Each purchaser may be provided with the option to either participate or not participate in such promotions by subscribing or unsubscribing to such service via web page 54. For example, an icon(s) may be provided within web page 54 to allow the user to subscribe and/or cancel this service.

Each time a user of network server 32 purchases a particular item, the purchaser may be given the option to participate in a program wherein a replacement, or new article, or product will automatically be sent to the purchaser, at pre-selected time periods. This program works most effectively regarding disposable, at least partially fungible articles, which purchasers tend to replace over time. In one embodiment, this program may take the form of an "underwear club." Since purchasers tend to replace undergarments over time, and often prefer to re-purchase identical undergarments, this program provides for the automatic replacement of such articles.

In practice, the purchaser of an undergarment may receive notification of such program at the time of sale, or immediately thereafter. By specifying their preferred participation, network server 32 will automatically store price, quantities, and shipping information regarding the particular user and the selected undergarment. At pre-selected time periods, for example, each month, network server 32 may then send notification to the manufacturer, supplier and/or the network operator to ship a replacement undergarment. The purchasers account, or credit card, may then be charged as appropriate, for the replacement undergarment. Alternatively, network server 32 may automatically generate a billing statement which may be forwarded to the purchaser alerting them to the charges incurred.

In another embodiment, the network operator may provide a simplified system for a user to shop for gifts for other individuals. Undergarments and other personal articles of clothing are often difficult to purchase as gifts. Certain measurements, physical characteristics and subjective preferences inherent in an individual must be known by a third party in order for the third party to purchase gifts for the individual. Virtual showroom 60 provides a private and personalized method for a third party to purchase gifts for an individual.

For example, a husband shopping for his wife may be discouraged from purchasing a gift for his wife unless he knows all of her measurements, characteristics and preferences. In one embodiment of the present invention, the husband could select articles of a certain style and/or color for purchase, without specifying the size. Concurrently, with the purchase, network server 32 may prompt the husband to identify his wife by account number, if she is a user of virtual showroom 60, and/or telephone number, electronic-mail address, or physical address, if she is not.

Upon receipt of the order from the husband/purchaser, network server may automatically prompt an electronic message to be delivered to the wife/recipient, identifying the purchaser, the recipient, and the items purchased. In one embodiment, the electronic message may invite the recipient, to "sign-on" to network server 32 in order to select the color, style, or other optional characteristics associated with the purchased items.

In another embodiment, the purchaser may indicate very general criteria regarding the gift selected including, but not limited to, the price, style, color, manufacturer and/or any other general characteristic associated with an article(s). In response to such an order network server 32 may send an electronic message to the recipient inviting the recipient to communicate their preferences from the remaining criteria, not previously selected by the purchaser.

The operator of network server 32 may maintain a certain stock, or inventory level of the products offered for sale on web page 54. Accordingly, network server 32 may automatically alert the network operator to distribute products to the purchasers after purchase. In another embodiment, the operator of network server 32, may function as a broker, simply matching up buyers and sellers of products, without maintaining inventory.

In yet another embodiment, the operator of network server 32 may maintain very limited supplies and inventory of the products offered for sale. Since purchasers of undergarments typically buy in large quantities, a single purchaser may exhaust the supply or inventory of the operator of network server 32. Network server may be configured to recognize this "out of stock" or "insufficient stock" status associated with an order, and automatically notify another vendor of the product to ship sufficient quantities to fulfill the purchaser's order. The selected vendor may be an operator of client system 36, such that the vendor may communicate with network server 32 via communication link 38. This allows correspondence between the vendor using client system 36 and the operator of network server 32 to occur electronically. Billing, payments, and account summaries may be exchanged between the operator of network server 32 and client system 36 via communication link 38.

Virtual showroom 60 provides a user with the option of entering a specialized boutique. For example, selection of "Her Room Boutique" icon 150 (FIG. 2) may transfer the user into another virtual showroom, for example, web page 56. Web page 56 may be limited to generally higher priced and generally higher quality merchandise as compared to virtual showroom 60. In order to create a specialized atmosphere for the "on-line" shopper, web page 56 may include distinctive graphics to create a unique and elite shopping experience.

In one embodiment, web page 56 may be limited to products of certain "high-end" manufacturers. In fact, the operator of server 32 may require that each manufacturer elects to have its products displayed within virtual showroom 60, or the "Her Room Boutique" or web page 56. In this embodiment, manufacturers could not be listed within virtual showroom 60 and "Her Room Boutique" 56. In a particular embodiment, "Her Room Boutique" may include higher quality and more intensive graphics as compared to virtual showroom 60.

The articles and products described within this specification have been primarily limited to undergarments and complementary articles, such as outer garments. It will be recognized by those of ordinary skill in the art that any product or article may be displayed within master display field 62, within the teachings of the present invention. For example, a featured article may include a shoe or boot. In one embodiment, the shoe or boot may be displayed upon a second article, for example, the form of a human foot. In another embodiment, the electronic image displayed within field 62 may include a photograph or other suitable depiction of an article being worn by a human.

Accordingly, overlay images available for display within field 62 include, but are not limited to, hats over heads, shoes over feet, gloves over hands, pants over legs, glasses over faces, etc.

Although the present invention has been described in several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A method of displaying a first article within a virtual showroom associated with a network server, comprising:
   providing a user with access to a web page of a virtual showroom, via the world wide web;
   displaying, on said web page, a first electronic image of a first article of clothing within a master display field;
   displaying the first article of clothing at least partially over a human form in a manner that the first article of clothing would be worn by a human;
   displaying, on said web page, a plurality of graphical objects, each object representing a complementary article of clothing suitable to be worn with the first article of clothing, wherein a user of said network server may select one of said plurality of complementary articles of clothing for display with said first article of clothing within said master display field;
   displaying a selected one of said plurality of complementary articles at least partially over the human form in a manner that the selected one of said complementary articles would be worn by the human; and
   displaying the selected one of said plurality of complementary articles at least partially over the first article of clothing in a manner that the selected one of said plurality of complementary articles would be worn over the first article of clothing.

2. The method of claim 1, further comprising overlaying a second electronic image representing said one of said plurality of complementary articles of clothing selected by said user over the first electronic image and storing a third electronic image, representing said second electronic image overlaying said first electronic image within a database accessible by said network server.

3. The method of claim 1, wherein displaying said selected one of said plurality of complementary articles comprises displaying a line drawing which displays an outline of said one of said plurality of complementary articles selected by said user.

4. The method of claim 1, wherein displaying said one of said plurality of complementary articles of clothing comprises displaying an at least partially translucent depiction of a substantial portion of said one of said plurality of complementary articles selected by said user.

5. The method of claim 1, further comprising displaying different perspective views of said first article.

6. The method of claim 1, wherein said plurality of graphical objects is equal to or greater than three.

7. The method of claim 1, further comprising:
   providing a distinctive characteristic to said one of said plurality of complementary articles selected by said user;
   and
   wherein said distinctive characteristic includes a first color scheme of said one of said complementary articles selected by said user, wherein each of said plurality of complementary articles not selected by said user include a second color scheme.

8. The method of claim 1, further comprising providing a distinctive characteristic to said one of said plurality of complementary articles selected by said user, wherein said distinctive characteristic includes a first size of said one of said complementary articles selected by said user, wherein each of said plurality of complementary articles not selected by said user includes a second size.

9. The method of claim 1, further comprising providing a distinctive characteristic to said one of said graphical objects selected by said user.

10. The method of claim 9, wherein said plurality of graphical objects is equal to or greater than three.

11. The method of claim 9, wherein said distinctive characteristic includes a first color scheme of said one of said graphical objects selected by said user, wherein each of said plurality of graphical objects not selected by said user include a second color scheme.

12. The method of claim 9, wherein said distinctive characteristic includes a first size of said one of said graphical objects selected by said user, wherein each of said plurality of graphical objects not selected by said user includes a second size.

13. The method of claim 1,
   wherein the selected one of said plurality of complementary articles is at least partially translucent and allows the purchaser to view the first article through the selected one of said plurality of complementary articles.

14. The method of claim 13, wherein the display of the selected complementary article comprises a line drawing of at least portions of the selected complementary article.

15. The method of claim 13, wherein the display of the selected complementary article comprises a scaled map.

16. The method of claim 15, wherein the scaled map conforms to contours of the selected complementary article.

* * * * *